United States Patent [19]
Loiselle

[11] Patent Number: 5,989,719
[45] Date of Patent: Nov. 23, 1999

[54] OIL RESISTANT LIQUID SILICONE RUBBER COMPOSITIONS

[75] Inventor: Brian Paul Loiselle, Midland, Mich.

[73] Assignee: Dow Corning Corporation, Midland, Mich.

[21] Appl. No.: 09/170,232

[22] Filed: Oct. 13, 1998

[51] Int. Cl.$^6$ ...................................................... B32B 9/04
[52] U.S. Cl. ........................... 428/447; 428/450; 428/451; 524/433; 524/436; 524/779; 528/15; 264/331.11
[58] Field of Search ..................................... 524/779, 433, 524/436; 264/331.11; 528/15; 428/447, 450, 451

[56] References Cited

U.S. PATENT DOCUMENTS

| | | | |
|---|---|---|---|
| 3,445,420 | 5/1969 | Kookostedes et al. | 260/37 |
| 3,690,804 | 9/1972 | Nave | 425/326 |
| 4,386,170 | 5/1983 | Monroe | 523/210 |
| 4,689,363 | 8/1987 | Inoue et al. | 524/394 |
| 5,013,781 | 5/1991 | Koshii et al. | 524/864 |
| 5,082,886 | 1/1992 | Jeram et al. | 524/403 |
| 5,378,742 | 1/1995 | Matsushita et al. | 523/213 |
| 5,595,826 | 1/1997 | Gray et al. | 428/450 |
| 5,908,878 | 6/1999 | Baity et al. | 523/203 |

Primary Examiner—Melvyn I. Marquis
Attorney, Agent, or Firm—Jennifer S. Warren

[57] ABSTRACT

A heat curable liquid silicone rubber composition with good hydrocarbon oil resistance comprises:

(A) a first vinyl-containing polydiorganosiloxane that is vinyldiorganosiloxy terminated, having a viscosity of from 20 to 200 Pa.s at 25° C. and containing essentially no ethylenically unsaturated hydrocarbon radicals bonded to non-terminal silicon atoms, (B) a second vinyl-containing polydiorganosiloxane that is either vinyldiorganosiloxy terminated or triorganosiloxy terminated, miscible with the first polydiorganosiloxane and having a viscosity of from about 0.1 to 200 Pa.s at 25° C. where from 1 to 5 mole percent of the non-terminal silicon atoms of the second vinyl-containing polydiorganosiloxane have a vinyl radical bonded thereto, (C) an organohydrogensiloxane resin miscible with (A) and (B) containing an average of more than five silicon bonded hydrogen atoms per molecule, (D) a platinum group hydrosilation catalyst, (E) a reinforcing silica filler, (F) an alkaline earth metal oxide acid acceptor or an alkaline earth metal hydroxide acid acceptor, and (G) an optional adhesion promoter.

21 Claims, No Drawings

OIL RESISTANT LIQUID SILICONE RUBBER COMPOSITIONS

United States patent application for OIL RESISTANT LIQUID SILICONE RUBBER COMPOSITIONS for which the following is a specification.

The present invention is a curable liquid silicone rubber composition with high resistance against engine oils, and gaskets made from the composition.

A growing practice in the automotive industry is to require the manufacturer of certain parts, such as oil pans and engine covers, to supply their parts with any gaskets installed in, or adhered directly to that part. This makes the part ready for assembly without requiring the auto assembly plant to stock gaskets in inventory or perform additional operations such as applying room-temperature curing sealants. While one method of fixing the gasket to the part is to attach the gasket with an adhesive, a newly developed method is to extrude an uncured polymer onto the part, and then to heat the part together with the polymer to create a gasket that is cured in place, and adhered directly to the part. If the polymer is of a stiff, non-self-leveling consistency the gasket can hold its shape, and gaskets of relatively thick cross section can be formed. For example, typical cross-sections can range from about 4 to 30 mm$^2$. Use of a cure system that allows for faster cure times by use of heat is preferable because the finished products can be handled and shipped from the components manufacturer to the assembly plant sooner.

Liquid silicone rubber compositions can be used to form the cured-in-place gaskets, as described above. These compositions typically contain at least one polydiorganosiloxane with at least two silicon-bonded vinyl radicals, an organohydrogensiloxane, a silica filler, and a hydrosilation catalyst. They can cure at temperatures ranging from ambient temperature over a period of several hours or days, or within several minutes when heated at temperatures of up to 250° C. Since they do not depend on moisture from the air to cure, they can be cured into configurations with thicker cross sections than typical room temperature vulcanizing silicone compositions. However, liquid silicone rubbers generally have poor oil resistance and are therefore not suitable for use in applications such as rocker cover gaskets, oil packings, valve stem seals, oil filters, seal rings, and shaft seals that are used in automobiles, ships, airplanes, and other motor vehicles. In particular, when silicone rubber is employed in regular or continuous contact with a hydrocarbon oil-based lubricating oil such as engine oil or gear oil, the silicone rubber swells and fissures or cracks can develop in it during long-term service. The silicone rubber can also revert back to its liquid state. Properties such as compression set deteriorate, and the sealing capability of the elastomer is eroded. As a consequence, leaks develop during long-term use.

Fluorosilicone rubbers are generally known in the art for their resistance to fuel, oil, chemicals, and solvents. For example, Matsushita et al., in U.S. Pat. No. 5,378,742 teach a composition for oil resistant rubber comprising dimethylsiloxane-3,3,3-trifluoropropylymethylsiloxane-methylvinylsiloxane copolymer gum, hydrocarbon oil or polydiorganosiloxane oil, a reinforcing filler, and a curing agent. Monroe, in U.S. Pat. No. 4,386,170, teaches a composition consisting essentially of a polydiorganosiloxane gum having from 45 to 50 percent of the organic radicals being 2-(perfluoroalkyl)ethyl radicals in which the perfluoroalkyl radical has from 1 to 4 carbon atoms, a reinforcing treated silica filler, a polytetrafluoroethylene powder, and a means for curing. The oil resistance is further improved by also including an alkaline earth metal oxide or alkaline earth metal hydroxide as an acid acceptor. However, fluorosilicone rubbers are relatively costly materials, and are not considered to be cost effective in many applications involving automotive component sealing. Therefore, there is generally a need to improve the performance of non-fluorinated liquid silicone rubbers in some applications requiring resistance to fuel, oil, chemicals and solvents.

Inoue et al., in U.S. Pat. No. 4,689,363, teach compositions for room-temperature curable silicone rubber resistant to oils. The compositions comprise 100 parts by weight of a linear polydiorganosiloxane terminated at both molecular chain ends each with a silanolic hydroxy group; from 1 to 25 parts by weight of an organosilicon having, in a molecule, at least two hydrolyzable groups bonded to the silicon atom or atoms; and from 1 to 50 parts of an alkali metal salt of a weak acid having a $PK_a$ in the range from 2.0 to 12.0 at 25° C. The polydimethylsiloxane has a viscosity in the range of 25 to 500 Pa.s, or preferably from 1 to 100 Pa.s at 25° C.

Koshii et al., in U.S. Pat. No. 5,013,781, teach compositions for room-temperature curable silicone rubber resistant to coolants and hydrocarbon oils. A polyorganosiloxane composed of $R^2{}_3SiO_{0.5}$ and $SiO_2$ or $R^2{}_3SiO_{0.5}$, $R^2{}_2SiO$ and $SiO_2$ units is included at 1 to 50 weight parts in a composition containing 100 parts polydiorganosiloxane, 5 to 300 weight parts inorganic filler, 0.1 to 10 weight parts alkoxysilane adhesion promoter, and a ketoxime silicon compound crosslinker. Koshii teaches that the polyorganosiloxane functions in combination with the alkoxysilane adhesion promoter to improve the hydrocarbon oil and coolant resistance of the silicone. The molar ratio of the $R^2{}_3SiO_{0.5}$ to $SiO_2$ in the polyorganosiloxane must be from 0.5:1 to 1.5:1. The polydiorganosiloxane has a viscosity within the range of 0.0001 to 0.1 m$^2$/s at 25° C., and the chain terminals contain a silicon-bonded hydroxyl group or a silicon-bonded hydrolyzable group.

SUMMARY OF THE INVENTION

The present invention is a heat curable liquid silicone rubber composition with good hydrocarbon oil resistance comprising:

(A) a first vinyl-containing polydiorganosiloxane that is vinyldiorganosiloxy terminated, having a viscosity of from 20 to 200 Pa.s at 25° C. and containing essentially no ethylenically unsaturated hydrocarbon radicals bonded to non-terminal silicon atoms, (B) a second vinyl-containing polydiorganosiloxane that is either vinyldiorganosiloxy terminated or triorganosiloxy terminated, which is miscible with the first polydiorganosiloxane and has a viscosity of from 0.1 to 200 Pa.s at 25° C. where from 1 to 5 mole percent of the non-terminal repeating units of the second polydiorganosiloxane contain a vinyl radical, (C) an organohydrogensiloxane resin that is miscible with (A) and (B), containing an average of more than five silicon-bonded hydrogen atoms per molecule, (D) a platinum group hydrosilation catalyst, (E) a reinforcing silica filler, (F) an alkaline earth metal oxide acceptor or an alkaline earth metal hydroxide acid acceptor, and (G) an optional adhesion promoter.

DESCRIPTION OF THE INVENTION

The present invention is a heat curable liquid silicone rubber composition with good hydrocarbon oil resistance comprising:

(A) 35 to 65 weight percent of a first vinyl-containing polydiorganosiloxane that is diorganovinylsiloxy terminated, having a viscosity of from about 20 to 200 Pa.s at 25° C. and essentially no ethylenically unsaturated hydrocarbon radicals bonded to non-terminal silicon atoms, (B) 2 to 30 weight percent, based on the total weight of (A) and (B), of a second vinyl-containing polydiorganosiloxane that is either diorganovinylsiloxy terminated or triorganosiloxy terminated, miscible with the first vinyl-containing polydiorganosiloxane and having a viscosity of from about 0.1 to 200 Pa.s at 25° C. where from 1 to 5 mole percent of non-terminal silicon atoms has a vinyl radical attached thereto, (C) an amount sufficient to cure the composition of an organohydrogensiloxane resin that is miscible with (A) and (B) containing an average of more than five silicon-bonded hydrogen atoms per molecule, (D) a platinum group hydrosilation catalyst in an amount sufficient to promote curing of the composition at a temperature of from ambient to about 250° C., (E) 10 to 60 weight percent, based on the weight of the composition, of a reinforcing silica filler, (F) 2 to 15 weight percent of an alkaline earth metal oxide acid acceptor or an alkaline earth metal hydroxide acid acceptor, and (G) an optional adhesion promoter.

The present curable composition comprises two miscible vinyl-containing polydiorganosiloxanes. Component (A) contains a vinyl only on the terminal positions of the molecule. Component (A) is present at a higher concentration in the composition than the second of the two polydiorganosiloxanes, referred to as component (B).

The term "essentially no ethylenically unsaturated hydrocarbon radicals bonded to non-terminal silicon atoms" used to describe component (A) means that the only ethylenically unsaturated hydrocarbon radicals present on the non-terminal silicon atoms of this component result from impurities present in the reactants used to prepare component A or from undesired rearrangements occurring during preparation of this component.

Component (A) is a liquid vinyl-containing polydiorganosiloxane, and can be represented by the general formula $ViR^1_2SiO(R^2_2SiO)_xSiR^1_2Vi$, where Vi represents a vinyl radical; $R^1$ and $R^2$ are independently selected monovalent hydrocarbon radicals or substituted monovalent hydrocarbon radicals substantially free of ethylenic unsaturation, and x represents a degree of polymerization equivalent to a viscosity of from 20 to 200 Pa.s at 25° C. In preferred embodiments the viscosity of component (A) is from 40 to 70 Pa.s at 25° C. The mole percent vinyl present in component (A) will depend on the molecular weight of the polymer. Generally, a range of from about 0.09 to 1.6 mole percent vinyl has been found to be useful. A preferred component (A) has about 0.2 to 0.3 mole percent vinyl.

The $R^1$ and $R^2$ radicals bonded to the silicon atoms of component (A) can comprise from 1 to about 20 carbon atoms and can be identical or different. Because component (A) is a liquid at 25° C., at least one of the $R^2$ radicals on each of the non-terminal silicon atoms are preferably methyl. The remaining $R^2$ radical can be an alkyl such as methyl or ethyl; substituted alkyls such as chloromethyl, or 3-chloropropyl; cycloalkyl such as cyclohexyl; or aryl such as phenyl. Preferably, $R^1$ and $R^2$ are not fluorine-containing, because of cost. Most preferably any $R^1$ and $R^2$ radicals other than methyl are phenyl. This preference is based on the availability of the intermediates used to prepare these polydiorganosiloxanes and the properties of cured elastomers prepared by curing compositions containing these polymers.

Component (B) is a liquid vinyl-containing polydiorganosiloxane and can be represented by the average general formula $ViR^1_2SiO(R^2_2SiO)_y(ViR^2SiO)_zSiR^1_2Vi$, or alternatively $R^3R^1_2SiO(R^2_2SiO)_y(ViR^2SiO)_zSiR^1_2R^3$. In this formula Vi represents a vinyl radical and $R^1$, $R^2$, and $R^3$ are selected from the same group of monovalent hydrocarbon radicals and substituted monovalent hydrocarbon radicals as $R^1$, and $R^2$ previously described. Because components A and B must be miscible with one another, the silicon bonded hydrocarbon radicals present in these components should be similar and preferably identical.

In Component (B) the degree of polymerization represented by the sum of y and z provides a viscosity within a range of from about 0.1 to 200 Pa.s at 25° C., preferably from 0.1 to 20 Pa.s at 25° C., and the ratio $z/(y+z)$ is from 0.01 to 0.20, which specifies the requirement for this component that from 1 to about 20 mole percent of the non-terminal repeating diorganosiloxane units comprise a vinyl radical. A preferred Component (B) contains vinyl radicals substituted on from about 1 to 5 mole percent of the non-terminal repeating siloxy units.

To achieve high oil resistance without adversely affecting other physical properties of the cured elastomer, component (B) constitutes from 2 to 30 weight percent, preferably from 10 to 25 weight percent, of the combined weight of components (A) and (B). Compositions containing more than about 30 percent by weight of component (B) yield elastomers with too high a degree of crosslinking, resulting in reduced values of elongation, tear strength and tensile strength. Less than about 2 percent by weight of component B will not provide the desired high level of oil resistance.

The combination of two miscible vinyl-containing polydiorganosiloxanes, components (A) and (B) of the present composition, are important to the improved oil resistance of the composition when cured. Methods for preparing the liquid polydiorganosiloxanes used as components (A) and (B) of the present compositions by hydrolysis and condensation of the corresponding halosilanes or cyclic polydiorganosiloxanes are sufficiently disclosed in the patent and other literature such that a detailed description of preparative methods in this specification is not necessary.

Component (C) of the present composition is an organohydrogensiloxane resin crosslinker comprising greater than 5 silicon-bonded hydrogen atoms per molecule. By "resin" it is meant that the crosslinker comprises at least 1 mole percent of units selected from $R^4SiO_{3/2}$ and $SiO_{4/2}$, where $R^4$ is selected from saturated monovalent hydrocarbon radicals comprising about one to about ten carbon atoms and aromatic hydrocarbon radicals. Component (C) further comprises units described by formulas $R^5SiO_{3/2}$, $R^4_2R^5SiO_{1/2}$ and $R^4R^5SiO_{2/2}$ where $R^5$ is selected from hydrogen atoms and monovalent hydrocarbon radicals comprising about one to ten carbon atoms and aromatic hydrocarbon radicals. $R^4$ and $R^5$ can be, for example, a lower alkyl such as methyl or ethyl; a substituted alkyl such as chloromethyl; or an aryl such as phenyl. Preferred is when $R^4$ is methyl. It is also preferred that component (C) comprise at least 10 silicon-bonded hydrogen atoms per molecule.

The viscosity of component (C) is not critical to the present invention, however it is preferred that component (C) have the viscosity of a pourable liquid at room temperature. If required, component (C) can be dissolved in a suitable solvent to facilitate mixing into the present composition.

One preferred component (C) for use in the present invention is a resin described by formula $(Me_3SiO_{1/2})_a$ $(Me_2SiO)_b(MeHSiO)_c(MeSiO_{3/2})_d$, where Me represents methyl, a=5 to 20, b=20 to 40, c=50 to 60 and d=3 to 5. Even more preferable is when this resin has a silicon-bonded hydrogen content in the range of 0.75 to 0.90 percent by weight of the resin.

A second preferred component (C) for use in the present invention comprises at least 80 percent by weight of a SiH-functional resin comprising $R^5_3SiO_{1/2}$ units and $SiO_{4/2}$ units at a ratio of about 1.82, and where each $R^5$ in the $R^5_3SiO_{1/2}$ unit is independently represented by a monovalent organic group as described above or a hydrogen atom.

Component (C) is added to the present composition in an amount sufficient to cure the composition. The silicon-bonded hydrogen atoms of component (C) react with the vinyl radicals of components (A) and (B) in a hydrosilation reaction. This reaction forms crosslinks to cure the composition to an elastomer. In order to obtain a high-quality cured product, the molar ratio of the total silicon-bonded hydrogen in this component to the total silicon-bonded vinyl provided by components (A) and (B) preferably falls in the range of 1:5 to 5:1. Even more preferably, component (C) is added at a concentration sufficient to provide a molar ratio of the total silicon-bonded hydrogen to the total per silicon-bonded vinyl provided to the composition by components (A) and (B) is 1.5:1 to 2.2:1.

The organohydrogensiloxane resin crosslinker comprising component (C) is another aspect of the present composition that is important to the improved oil resistance of the composition when cured. As can be seen in the examples below, the use of component (C) gives better oil resistance characteristics than the use of a linear organohydrogensiloxane that is merely mixed with a organosilicon resin.

Component (D) is a platinum group hydrosilation catalyst. Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described, for example, in U.S. Pat. No. 3,419,593 issued to David N. Willing on Dec. 31, 1968. Complexes of platinum group metals with low molecular weight organosiloxanes wherein the silicon bonded hydrocarbon radicals are vinyl and methyl are particularly preferred because of their ability to catalyze a rapid curing of the elastomer at temperatures of at least about 70° C.

The platinum group hydrosilation catalyst can be present in an amount equivalent to as little as one part by weight of platinum group metal per one million parts of curable composition. Catalyst concentrations equivalent to from 5 to 50 parts of platinum group metal per million parts of curable composition are preferred to achieve a practical curing rate. Higher concentrations of catalysts provide only marginal improvements in curing rate, and are therefore economically unattractive, particularly when the preferred platinum catalysts are used.

Mixtures of the vinyl-containing polymers, curing agents and platinum group hydrosilation catalysts may begin to cure at ambient temperature. To obtain a longer working time or "pot life", the activity of the catalyst under ambient conditions can be retarded or suppressed by addition of a suitable inhibitor.

Known platinum group metal catalyst inhibitors include the acetylenic compounds disclosed in U.S. Pat. No. 3,445, 420, issued on May 20, 1969 to Kookootsedes et al. Acetylenic alcohols such as 2-methyl-3-butyn-2-ol constitute a preferred class of inhibitors that suppress the activity of a platinum-containing catalyst at 25° C. Compositions containing these catalysts typically require heating at temperatures of 70° C. or above to cure at a practical rate.

Inhibitor concentrations as low as one mole of inhibitor per mole of platinum group metal will in some instances impart satisfactory storage stability and cure rate. In other instances inhibitor concentrations of up to 500 or more moles of inhibitor per mole of platinum group metal are required. The optimum concentration for a given inhibitor in a given composition can readily be determined by routine experimentation.

To thicken the curable liquid silicone rubber compositions to be suitable for use in cured-in place applications, and to achieve adequate physical properties that characterize cured elastomers prepared using the compositions of this invention, the compositions must contain a reinforcing silica filler, component (E).

Any finely divided form of silica can be used as the reinforcing filler. Colloidal silicas are preferred because of their relatively high surface area, which is typically at least 50 square meters per gram. Fillers having surface areas of at least 300 square meters per gram are preferred for use in the present compositions. The colloidal silicas can be prepared by precipitation or a fume process and are commercially available.

The amount of reinforcing silica filler used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The reinforcing silica filler is typically treated with any of the known silica treating agents to prevent a phenomenon referred to as creping or crepe-hardening during processing of the curable composition. The silica treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the silica to form compounds with silicon-bonded hydroxyl groups. Preferably at least a portion of the silicon bonded hydrocarbon radicals present on the treating agent are identical to a majority of the hydrocarbon radicals present in components (A) and (B). A small amount of water can be added together with the silica treating agent(s) as a processing aid.

Component (F) is an alkaline earth metal oxide acid acceptor or an alkaline earth metal hydroxide acid acceptor. The addition of component (F) to the composition has been found to improve resistance to the effect of oils that have been heated for long periods at elevated temperatures. Component (F) may be finely divided alkaline earth metal oxides and hydroxides such as magnesium oxide, calcium oxide, and calcium hydroxide. The use of component (F) has been found to be important to the oil resistance of the compositions of the current invention. Surprisingly, however, the use of component (F) alone will not by itself give a typical liquid silicone rubber composition adequate oil resistance.

Component (G) is an optional adhesion promoter, useful for silicone cured-in-place gasket materials, and may comprise a single component or a multiple component package. Gray et al., in U.S. Pat. No. 5,595,826 disclose an adhesion promoting mixture comprising an epoxy functional compound, a compound having at least one hydroxy group and in the same molecule at least one substituent selected from a group consisting of silicon hydride, alkenyl and acryl, and an aluminum compound or zirconium compound, and is incorporated by reference as an example of a useful adhesion promoter. Component (G) improves the adhesion of the present composition to substrates including plastics, such as vinyl esters and nylon, and metals, such as stainless steel, galvanized steel, cast aluminum, and rolled aluminum. This improved adhesion is beneficial in fabricating parts with gaskets attached to them and in improving the sealing of the gasket in service.

The curable silicone rubber compositions of this invention can contain one or more additives that are conventionally present in curable compositions of this type. These materials are added to impart or enhance certain properties of the cured elastomer or facilitate processing of the curable composition. Typical additives include but are not limited to pigments, dyes, flame retardants, and heat and ultraviolet light stabilizers.

In preparation of the present composition, the silica filler (E) can be treated with the treating agent in the presence of at least a portion of the other components of the present compositions by blending these components together until the filler is completely treated and uniformly dispersed throughout the composition to form a homogeneous material. The components that are present during treatment of the silica can typically include a portion of the polydiorganosiloxanes components (A) and (B). Because the silica treatment is typically carried out at temperatures above ambient, the organohydrogensiloxane and platinum-containing catalyst are typically added after treatment of the silica has been completed.

Typically, after treatment of the reinforcing silica filler, the composition comprising the treated silica is heated at temperatures from about 100 to 250° C., under reduced pressure to remove volatile materials. The resultant product is then cooled prior to being blended with the organohydrogensiloxane resin crosslinker, component (C), and/or the platinum catalyst, component (D), depending upon whether it is desired to prepare a one-part or two-part curable composition. The optional additives referred to above can be added at this time or during blending of the silica with component (A).

The in-situ treatment of the silica can require anywhere from 15 minutes to 2 hours, depending upon the amount of material being processed, the viscosity of the material and the shear rate to which the material is subjected during processing.

Alternatively, treatment of the reinforcing silica filler can occur before the silica is blended with other components of the present compositions. Methods for treating finely divided silica fillers prior to incorporating the silica into a polyorganosiloxane composition are known in the art.

To ensure adequate blending of all components, it is preferred that the mixing equipment in which the present compositions are prepared should be capable of subjecting the composition to a high rate of shear. The advantage of using this type of a mixer to prepare silica filled polyorganosiloxane compositions is taught in U.S. Pat. No. 3,690,804, which issued to Minuto on Jun. 1, 1976, which is hereby incorporated by reference. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with sigma shape blades, are not as efficient as mixers wherein the mixing surfaces are of a relatively flat paddle configuration. Examples of the paddle type mixers include the Henschel mixer disclosed in the aforementioned Minuto patent and certain mixers manufactured by Neulinger A. G. The blade is preferably rotated at a speed of at least 100 revolutions per minute.

Curable liquid silicone rubber compositions prepared using the present method typically exhibit viscosities of about 0.5 to about 1000 Pa.s at 25° C. To facilitate blending and transfer of the compositions and minimize entrapment of air during mixing a viscosity of less than about 10 Pa.s at 25° C. is preferred, particularly for extrudable compositions.

The present curable liquid silicone rubber compositions can be formed into shaped articles by press molding, injection molding, extrusion, or any of the other methods used to fabricate organosiloxane compositions. However, the compositions are particularly suitable for making extruded gaskets having relatively large cross sectional areas.

In the absence of a catalyst inhibitor the present liquid silicone rubber compositions will cure at ambient temperature over a period of several hours or days, or within in several minutes when heated at temperatures of up to 250° C. The present compositions are typically cured by heating them for several minutes at temperatures of from 50 to about 250° C. A preferred range is from 100 to 200° C.

EXAMPLES

The following examples are intended to illustrate the present invention and are not intended to limit the invention as defined in the accompanying claims. In the examples all parts and percentages are by weight and all viscosities were measured at 25° C.

The silicone elastomers of the examples were prepared according to the following method. Part A of each of the examples was prepared by pre-mixing any fillers with polymer to essentially wet out the filler. This pre-mix was then combined with all of the other components of Part A and mixed with a metal stirring blade for 10 minutes. The formulated material was centrifuged to remove entrained air. Part B of each of the example silicone elastomers was prepared by combining all of the components of Part B and mixing with a metal stirring blade for 10 minutes. The formulated material was then centrifuged to remove any entrained air.

Silicone rubber slabs of each composition were prepared by mixing together 100 parts by weight of Part A and 100 parts by weigh of Part B. The material was mixed for two-12 second cycles in a Hauschild and Company Centrifugal Mixer, Type AM 501. Slabs were prepared in a chase sprayed with Miller-Stevenson TFE Release Agent MS-136. The chase consists of 2 sheets of flat aluminum 0.30 m×0.30 m×0.2 cm that are used for the upper and lower plates. The center of the chase is a flat aluminum frame 0.2 cm thick with outside measurements of 0.30 m×0.30 m and an inside measurement of 0.25 m×0.25 m. The center chase was laid upon the lower plate with the corners and sides aligned. The mixed elastomer formulation was transferred to the center of the lower plate and spread to fill in the center frame. The upper plate was placed on top of the center frame and the was then cold pressed for 1 to 3 minutes in a press under 27,000 kg of pressure to remove any entrapped air and effect complete fill of the center frame. After cold pressing, the filled chase was placed in a 150° C. pre-heated press and pressed cured for 5 minutes at 32,000 kg of pressure. After curing, the 0.25 m×0.25 m×0.2 cm slab was removed from the chase and allowed to equilibrate at room temperature for a minimum of 24 hours before any testing.

The Specific Gravity of the elastomers prepared in the examples were determined according to ASTM D 792. Durometer, (shore A hardness), was determined according to ASTM D 2240. Tensile and Elongation properties were determined according to ASTM D 412 (die C). Hot air (177° C.) compression set was determined by ASTM D 395 Method B. The specific gravity, durometer, tensile, elongation, and compression set properties are reported in Table 1.

Hot oil compression set testing on the Comparative Examples and Example 1 were conducted using the principles of ASTM D 395, however the elastomer sample was a 0.64 cm thick puck. The outer diameter of the sample was 0.03238 m+/−0.00003 m with a 0.0127 m inner diameter hole running through the center. The upper and lower compression plates had a 0.00952 m hole running through the center of the plate. The holes in the samples and compression plates allow for free flow of oil around the entire sample during testing. Periodically, the samples were removed from the hot oil for measurement of its retained thickness and calculated compression set. During this time period, the samples were removed from the compression set jigs, and allowed to equilibrate to room temperature for a minimum of 1 hour before any measurements were made. After the measurements were taken, the sample and the compression set jigs were reassembled and placed back in new test fluid and placed back in the oven for further aging. The hot oil compression set results are listed in Table II.

Comparative Example I

Contains Calcium Hydroxide, no methyl vinyl or resinous cross-linker

A curable liquid silicone rubber composition of the following description was prepared:

Part A 83 parts by weight of a pre-reacted neutral base consisting of;

48 parts by weight of a dimethylvinylsiloxy-terminated dimethylsiloxane, polymer having a viscosity of approximately 55,000 mPa.s, and a vinyl content of approximately 0.09 weight percent, 16 parts by weight of a trimethylsilyl-treated fumed silica, and 44 parts by weight of a trimethylsilyl treated quartz;

15 parts by weight of a dimethylvinylsiloxy-terminated dimethylsiloxane polymer having a viscosity of approximately 55,000 mPa.s, and a vinyl content of approximately 0.09 weight percent, 1.7 parts by weight of calcium hydroxide, 0.3 parts by weight of a reaction product of hexachloroplatinic acid and symtetramethyldivinyldisiloxane that has been diluted with a liquid dimethylvinylsiloxy terminated polydimethylsiloxane in an amount sufficient to provide a platinum content of 0.6 weight percent.

Part B 85 parts by weight of a pre-reacted neutral base consisting of:

48 parts by weight of a dimethylvinylsiloxy-terminated dimethylsiloxane polymer having a viscosity of approximately 55,000 mPa.s, and a vinyl content of approximately 0.09 weight percent, 16 parts by weight of a trimethylsilyl-treated fumed silica, and 44 parts by weight of a trimethylsilyl treated quartz, 13.2 parts by weight of a dimethylvinylsiloxy-terminated dimethylsiloxane polymer, having a viscosity of approximately 55,000 mPa.s, and a vinyl content of approximately 0.09 weight percent, 1.1 parts by weight of a trimethylsiloxy-terminated dimethyl, methyl hydrogen siloxane, 0.6 parts by weight of benzyl alcohol, and 0.1 parts by weight of ethynyl cyclohexanol.

Comparative Example II

No Calcium hydroxide, contains methyl vinyl siloxane and resinous cross-linker

A curable liquid silicone rubber composition of the following description was prepared:

Part A 66.9 parts by weight of a pre-reacted neutral base consisting of;

51 parts by weight of a dimethylvinylsiloxy-terminated dimethylsiloxane polymer having a viscosity of approximately 55,000 mPa.s, and a vinyl content of approximately 0.09 weight percent, 2.0 parts by weight of a hydroxy-terminated dimethyl siloxane polymer, having a viscosity of approximately 41 mPa.s and an hydroxyl content of 3.1 weight percent, 27 parts by weight of a trimethylsilyl treated fumed silica, and 20 parts by weight of a trimethylsilyl treated quartz, 29.2 parts by weight of a dimethylvinylsiloxy terminated dimethyl, methylvinyl siloxane polymer, with a viscosity of approximately 350 mPa.s and a vinyl content of approximately 1.2 weight percent 3.3 parts by weight of a dimethylvinylsiloxy-tenninated dimethylsiloxane polymer having a viscosity of approximately 55,000 mpa.s, and a vinyl content of approximately 0.09 weight percent.

0.6 parts by weight of the reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.6 weight percent.

Part B 85.8 parts by weight of a pre-reacted neutral base consisting of;

51 parts by weight of a dimethylvinylsiloxy-terminated dimethylsiloxane polymer having a viscosity of approximately 55,000 mPa.s, and a vinyl content of approximately 0.09 weight percent, 2.0 parts by weight of a hydroxy-terminated dimethyl siloxane, polymer having a viscosity of approximately 41 mPa.s and an hydroxyl content of 3.1 weight percent, 27 parts by weight of a trimethylsilyl treated fumed silica, and 20 parts by weight of a trimethylsilyl treated quartz, 5.4 parts by weight of a dimethylvinylsiloxy terminated dimethyl, methylvinyl siloxane polymer with a viscosity of approximately 350 mPa.s and a vinyl content of approximately 1.2 weight percent.

4.3 parts by weight of a dimethylvinylsiloxy-terminated dimethylsiloxane polymer having a viscosity of approximately 55,000 mPa.s, and a vinyl content of approximately 0.09 weight percent.

4.4 parts by weight of dimethyl, methylhydrogen siloxane with methyl silsesquioxane having a viscosity of 16 mPa.s and a hydrogen content of approximately a 0.8 weight percent. 0.1 parts by weight of ethynyl cyclohexanol.

Comparative Example III

Magnesium hydroxide, No methyl vinyl siloxane and resinous cross-linker

A curable liquid silicone rubber composition of the following description was prepared:

Part A 96.2 parts by weight of a pre-reacted neutral base consisting of;

61.3 parts by weight of a dimethylvinylsiloxy-terminated dimethylsiloxane polymer having a viscosity of approximately 55,000 mPa.s, and a vinyl content of approximately 0.09 weight percent, 21.3 parts by weight of a trimethylsilyl and dimethylvinylsilyl treated fumed silica, and 16.3 parts by weight of quartz, 1.1 parts by weight of a hydroxy-terminated dimethyl siloxane, polymer having a viscosity of approximately 41 cst. and an hydroxyl content of 3.1 weight percent, 2.4 parts by weight of magnesium hydroxide, 0.6 parts by weight of the reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.6 weight percent, 0.8 parts by weight of carbon black.

Part B 96.3 parts by weight of a pre-reacted neutral base consisting of;

61.3 parts by weight of a dimethylvinylsiloxy-terminated dimethylsiloxane, polymer having a viscosity of approximately 55,000 mPa.s, and a vinyl content of approximately 0.09 weight percent, 21.3 parts by weight of a trimethylsilyl and dimethylvinylsilyl treated fumed silica, and 16.3 parts by weight of quartz, 1.1 parts by weight of a hydroxy-tenninated dimethyl siloxane, polymer having a viscosity of approximately 41 cst. and an hydroxyl content of 3.1 weight percent, 1.4 parts by weight of a dimethylhydrogensiloxy-modified silica having a viscosity of 24 cst and a hydrogen content of approximately a 1.0 weight percent, 0.1 parts by weight of ethynyl cyclohexanol.

1.2 parts by weight of tetrapropyl orthosilicate, and 1.0 parts by weight methyl methacrylate.

Comparative Example IV

No Calcium hydroxide, contains methyl vinyl siloxane, No resinous cross-linker

A curable liquid silicone rubber composition of the following description was prepared:

Part A 66.9 parts by weight of a pre-reacted neutral base consisting of;

51 parts by weight of a dimethylvinylsiloxy-terminated dimethylsiloxane polymer having a viscosity of approximately 55,000 mPa.s, and a vinyl content of approximately 0.09 weight percent, 2.0 parts by weight of a hydroxy-terminated dimethyl siloxane polymer having a viscosity of approximately 41 mPa.s and an hydroxyl content of 3.1 weight percent, 27 parts by weight of a trimethylsilyl treated fumed silica, and 20 parts by weight of a trimethylsilyl treated quartz, 29.3 parts by weight of a dimethylvinylsiloxy terminated dimethyl, methylvinyl siloxane polymer with a viscosity of approximately 350 mpa.s and a vinyl content of approximately 1.2 weight percent, 3.3 parts by weight of a dimethylvinylsiloxy-terminated dimethylsiloxane, polymer having a viscosity of approximately 55,000 mPa.s, and a vinyl content of approximately 0.09 weight percent, 0.6 parts by weight of the reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.6 weight percent.

Part B 85.6 parts by weight of a pre-reacted neutral base consisting of;

51 parts by weight of a dimethylvinylsiloxy-terminated dimethylsiloxane polymer having a viscosity of approximately 55,000 mpa.s, and a vinyl content of approximately 0.09 weight percent, 2.0 parts by weight of a hydroxy-terminated dimethyl siloxane polymer having a viscosity of approximately 41 mPa.s and an hydroxyl content of 3.1 weight percent, 27 parts by weight of a trimethylsilyl treated fumed silica, and 20 parts by weight of a trimethylsilyl treated quartz, 5.3 parts by weight of a dimethylvinylsiloxy-terminated dimethyl, methylvinyl siloxane polymer with a viscosity of approximately 350 cst. and a vinyl content of approximately 1.2 weight percent, 4.4 parts by weight of a, dimethylvinylsiloxy-terminated dimethylsiloxane polymer having a viscosity of approximately 55,000 cst, and a vinyl content of approximately 0.09 weight percent, 4.6 parts by weight of dimethyl, methylhydrogen siloxane having a viscosity of 5 cst and a hydrogen content of approximately a 0.75 weight percent, 0.1 parts by weight of ethynyl cyclohexanol.

Comparative Example V

Calcium hydroxide, methyl vinyl siloxane, organosilicon resinous and linear organobydrogensiloxane crosslinker A curable liquid silicone rubber composition of the following description was prepared:

One-Part 66.2 parts by weight of a pre-reacted neutral base consisting of;

51 parts by weight of a dimethylvinylsiloxy-terminated dimethylsiloxane polymer having a viscosity of approximately 55,000 mPa.s, and a vinyl content of approximately 0.09 weight percent, 2.0 parts by weight of a hydroxy-terminated dimethyl siloxane polymer having a viscosity of approximately 41 mPa.s and an hydroxyl content of 3.1 weight percent, 27 parts by weight of a trimethylsilyl treated fumed silica, and 20 parts by weight of a trimethylsilyl treated quartz.

6.3 parts by weight of a dimethylvinylsiloxy terminated dimethyl, methylvinyl siloxane polymer with a viscosity of approximately 350 mPa.s and a vinyl content of approximately 1.2 weight percent, 4.6 parts by weight of calcium hydroxide, 0.2 parts by weight of the reaction product of hexachloroplatinic acid and symtetramethyldivinyldisiloxane that has been diluted with a liquid dimethylvinylsiloxy terminated polydimethylsiloxane in an amount sufficient to achieve a platinum content of 0.6 weight percent.

3.3 parts by weight of a dimethylvinylsiloxy-terminated dimethylsiloxane, polymer having a viscosity of approximately 55,000 mPa.s, and a vinyl content of approximately 0.09 weight percent, 6.4 parts by weight of a dimethylvinylsiloxy-terminated dimethylsiloxane, polymer having a viscosity of approximately 13,000 mPa.s, and a vinyl content of approximately 0.21 weight percent, 3.5 parts by weight of a vinylmethylsilicone resin consisting of $SiO_{4/2}$ and $Me_2ViSiO_{1/2}$ units, having a vinyl content of approximately 2 weight percent, 0.5 parts by weight of a dimethylhydrogensiloxy-modified silica having a viscosity of 24 cst and a hydrogen content of approximately a 1.0 weight percent, 9.0 parts by weight of dimethyl, methylhydrogen siloxane having a viscosity of 135 cst and a hydrogen content of approximately a 0.12 weight percent, 0.1 parts by weight of ethynyl cyclohexanol.

Example I

Calcium hydroxide, methyl vinyl siloxane, resinous cross-linker

A curable liquid silicone rubber composition of the following description was prepared:

Part A 62.7 parts by weight of a pre-reacted neutral base consisting of;

51 parts by weight of a dimethylvinylsiloxy-terminated dimethylsiloxane polymer having a viscosity of approximately 55,000 cst., and a vinyl content of approximately 0.09 weight percent, 2.0 parts by weight of a hydroxy-terminated dimethyl siloxane polymer having a viscosity of approximately 41 cst. and an hydroxyl content of 3.1 weight percent, 27 parts by weight of a trimethylsilyl treated fumed silica, and 20 parts by weight of a trimethylsilyl treated quartz.

27.4 parts by weight of a dimethylvinylsiloxy-terminated dimethyl, methylvinyl siloxane polymer with a viscosity of approximately 350 cst. and a vinyl content of approximately 1.2 weight percent, 3.1 parts by weight of a dimethylvinylsiloxy-terminated dimethylsiloxane polymer having a viscosity of approximately 55,000 cst, and a vinyl content of approximately 0.09 weight percent, 6.3 parts by weight of calcium hydroxide, 0.5 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent.

Part B 86.0 parts by weight of a pre-reacted neutral base consisting of;

51 parts by weight of a dimethylvinylsiloxy-terminated dimethylsiloxane polymer having a viscosity of approximately 55,000 cst., and a vinyl content of approximately 0.09 weight percent, 2.0 parts by weight of a hydroxy-terminated dimethyl siloxane polymer having a viscosity of approximately 41 cst. and an hydroxyl content of 3.1 weight percent, 27 parts by weight of a trimethylsilyl treated fumed silica, and 20 parts by weight of a trimethylsilyl treated quartz.

5.4 parts by weight of a dimethylvinylsiloxy-terminated dimethyl, methylvinyl siloxane, polymer with a viscosity of approximately 350 cst. and a vinyl content of approximately 1.2 weight percent, 4.3 parts by weight of a dimethylvinylsiloxy-terminated dimethylsiloxane, polymer having a viscosity of approximately 55,000 cst, and a vinyl content of approximately 0.09 weight percent, 4.2 parts by weight of a dimethyl, methylhydrogen siloxane with methyl silsesquioxane having a viscosity of 16 cst and a hydrogen content of approximately a 0.8 weight percent, 0.1 parts by weight of ethynyl cyclohexanol.

TABLE I

Physical Properties

| | Comparative Example I | Comparative Example II | Comparative Example III | Comparative Example IV | Comparative Example V | Example I |
|---|---|---|---|---|---|---|
| Specific Gravity | 1.35 | 1.19 | 1.20 | 1.20 | 1.21 | 1.19 |
| Durometer (Shore A) | 49 | 56 | 31 | 49 | 37 | 58 |
| Tensile (kPa) | 4930 | 6150 | 7763 | 5750 | 3934 | 6000 |
| Elongation (%) | 395 | 183 | 860 | 247 | 377 | 191 |
| Compression Set (%) (177° C., 22 hrs, Air) | 17 | 23 | 37 | 34 | 32 | 37 |

TABLE II

Hot Oil Compression Test Results

| | Comparative Example I | Comparative Example II | Comparative Example III | Comparative Example IV | Comparative Example V | Example I |
|---|---|---|---|---|---|---|
| Durometer Loss (pts) (@ 100% Set*) | 30 | 15 | 31 | 13 | 15 | 15 |
| Time to reach 100% Compression Set (Hours in oil*) | 1128 | 1800 | 1176 | 1800 | 1320 | 4824 |

*Mobil HP 5W30 SH Oil at 150° C. with periodic change of oil every 300–600 hrs

We claim:
1. A heat curable liquid silicone rubber composition comprising:
   (A) 35 to 65 weight percent of a first vinyl-containing polydiorganosiloxane that is diorganovinylsiloxy terminated, having a viscosity of from about 20 to 200

Pa.s at 25° C., and essentially no ethylenically unsaturated hydrocarbon radicals bonded to non-terminal silicon atoms, (B) 2 to 30 weight percent, based on the total weight of (A) and (B), of a second vinyl-containing polydiorganosiloxane that is either diorganovinylsiloxy terminated or triorganosiloxy terminated, miscible with the first vinyl-containing polydiorganosiloxane, having a viscosity of from 0.1 to 200 Pa.s at 25° C., where from 1 to 5 mole percent of the non-terminal silicon atoms has a vinyl radical bonded thereto, (C) an amount sufficient to cure the composition of an organohydrogensiloxane resin crosslinker miscible with (A) and (B), containing an average of more than five silicon-bonded hydrogen atoms per molecule, (D) a platinum group metal hydrosilation catalyst in an amount sufficient to promote curing of the composition at a temperature of from ambient to 250° C., (E) 10 to 60 weight percent, based on the weight of the composition, of a reinforcing silica filler, and (F) 2 to 15 weight percent of an alkaline earth metal oxide acid acceptor or alkaline earth metal hydroxide acid acceptor.

2. The composition of claim 1 where component (A) comprises from about 0.09 to about 1.6 mole percent vinyl.

3. The composition of claim 1 where component (A) comprises about 0.2 to 0.3 mole percent vinyl.

4. The composition of claim 1 where (A) is a dimethylvinylsiloxy-terminated polydimethylsiloxane.

5. The composition of claim 1 where component (B) comprises about 1 to 21 mole percent vinyl.

6. The composition of claim 1 where component (B) is present at 10 to 25 weight percent, based on the total weight of components (A) plus (B).

7. The composition of claim 1 where component (C) comprises at least 10 silicon-bonded hydrogen per molecule.

8. The composition of claim 1 where (C) is represented by the formula $(Me_3SiO_{1/2})_a(Me_2SiO)_b(MeHSiO)_c(MeSiO_{3/2})_d$, where Me represents methyl, a=5 to 20, b=20 to 40, c=50 to 60 and d=3 to 5.

9. The composition of claim 8 where component (C) has a silicon-bonded hydrogen content in the range of 0.75 to 0.90 percent by weight of the resin.

10. The composition of claim 1 where component (C) comprises at least 80 percent by weight of a SiH-functional resin comprising $R^5_3SiO_{1/2}$ units and $SiO_{4/2}$ units, where each $R^5$ is independently selected from a monovalent organic group or a hydrogen atom, and the ratio of $R^5_3SiO_{1/2}$ units to $SiO_{4/2}$ is about 1.82.

11. The composition of claim 1 where the SiH groups provided by component (C) are in a ratio of from about 1.2:1 to 3:1 to the total vinyl groups present in components (A) and (B) together.

12. The composition of claim 1 comprising 30 to 50 weight percent reinforcing silica filler, based on the weight of (A) and (B) and (C).

13. The composition of claim 1 where component (F) is selected from the group consisting of magnesium hydroxide, magnesium oxide, calcium oxide, and calcium hydroxide.

14. The composition of claim 1 where the acid acceptor component (F) is calcium hydroxide.

15. The composition of claim 14 where the calcium hydroxide is present at a level of from about 2.5 to 8.3 weight percent.

16. The composition of claim 1 further comprising (G) an adhesion promoter.

17. The composition of claim 16, where the adhesion promoter is a mixture comprising an epoxy functional compound, a compound having at least one hydroxy group and in the same molecule at least one substituent selected from the group consisting of silicon hydride, alkenyl and acryl; and an aluminum compound or zirconium compound.

18. A gasket formed by curing a curable silicone rubber composition, comprising (A) 35 to 65 weight percent of a first vinyl-containing polydiorganosiloxane that is vinyldiorganosiloxy terminated, having a viscosity of from about 20 to 200 Pa.s at 25° C., and containing essentially no ethylenically unsaturated hydrocarbon radicals bonded to non-terminal silicon atoms, (B) 2 to 30 weight percent, based on the total weight of (A) and (B), of a second vinyl-containing polydiorganosiloxane that is either vinyldiorganosiloxy terminated or triorganosiloxy terminated, miscible with the first polydiorganosiloxane and having a viscosity of from about 0.1 to 200 Pa.s at 250° C. where from 1 to 5 mole percent of the non-terminal silicon atoms of the second polydiorganosiloxane have a vinyl radical bonded thereto, (C) an amount sufficient to cure the composition of an organohydrogensiloxane resin crosslinker miscible with (A) and (B), containing an average of more than five silicon bonded hydrogen atoms per molecule, (D) a platinum group hydrosilation catalyst in an amount sufficient to promote curing of the composition at a temperature of from ambient to about 250° C., (E) 10 to 60 weight percent, based on the weight of the composition, of a reinforcing silica filler, and (F) from 2 to 15 weight percent of an alkaline earth metal oxide acid acceptor or alkaline earth metal hydroxide acid acceptor.

19. The gasket of claim 18, where the gasket has a cross-sectional area in the range of about 4 to 30 mm².

20. The gasket of claim 18 for where the gasket is formed by (1) extruding the curable silicone rubber composition onto a first substrate, to form an assembly, and (2) heating the assembly at a temperature between 50 and 250° C. to cure the silicone rubber composition.

21. An assembly formed according to claim 20, where the substrate is selected from the group consisting of vinyl esters, nylon, stainless steel, galvanized steel, cast aluminum, and rolled aluminum.

* * * * *